(12) United States Patent
Zeineh et al.

(10) Patent No.: US 12,481,885 B2
(45) Date of Patent: *Nov. 25, 2025

(54) SYSTEMS AND METHODS TO TRAIN A CELL OBJECT DETECTOR

(71) Applicant: Icahn School of Medicine at Mount Sinai, New York, NY (US)

(72) Inventors: Jack Zeineh, New York, NY (US); Marcel Prastawa, New York, NY (US); Gerardo Fernandez, New York, NY (US)

(73) Assignee: Icahn School of Medicine at Mount Sinai, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,216

(22) Filed: Mar. 21, 2024

(65) Prior Publication Data

US 2024/0232627 A1  Jul. 11, 2024

Related U.S. Application Data

(63) Continuation of application No. 17/613,433, filed as application No. PCT/US2020/034320 on May 22, 2020, now Pat. No. 11,966,842.

(60) Provisional application No. 62/852,184, filed on May 23, 2019.

(51) Int. Cl.
| | | |
|---|---|---|
| G06V 10/774 | (2022.01) | |
| G06N 3/045 | (2023.01) | |
| G06N 3/08 | (2023.01) | |
| G06T 7/00 | (2017.01) | |
| G06V 10/82 | (2022.01) | |
| G06V 20/69 | (2022.01) | |
| G06V 30/24 | (2022.01) | |

(52) U.S. Cl.
CPC ............... *G06N 3/08* (2013.01); *G06N 3/045* (2023.01); *G06T 7/0012* (2013.01); *G06V 10/774* (2022.01); *G06V 10/82* (2022.01); *G06V 20/69* (2022.01); *G06V 20/698* (2022.01); *G06V 30/2504* (2022.01)

(58) Field of Classification Search
None
See application file for complete search history.

(56) References Cited

U.S. PATENT DOCUMENTS

| | | |
|---|---|---|
| 4,523,278 A | 6/1985 | Reinhardt |
| 5,719,024 A | 2/1998 | Cabib |
| 10,943,346 B2 | 3/2021 | Wirch |
| 11,093,729 B2 | 8/2021 | Ohsaka |
| 11,379,516 B2 * | 7/2022 | Peng .................. G06F 16/55 |
| 11,966,842 B2 * | 4/2024 | Zeineh ................. G06N 3/08 |
| 2011/0206262 A1 | 8/2011 | Sammak |

(Continued)

FOREIGN PATENT DOCUMENTS

| | | | |
|---|---|---|---|
| CN | 105913076 A * | 8/2016 | ............... G06N 3/08 |
| WO | WO-2017075294 A1 * | 5/2017 | ......... C12N 15/1093 |

OTHER PUBLICATIONS

Extended European Search Report In European Application No. 20809263.5, Apr. 25, 2023, 11 pages.

(Continued)

*Primary Examiner* — Tsung Yin Tsai
(74) *Attorney, Agent, or Firm* — IP Spring

(57) ABSTRACT

Systems and methods to train a cell object detector are described.

29 Claims, 8 Drawing Sheets

(56) References Cited

U.S. PATENT DOCUMENTS

| | | | |
|---|---|---|---|
| 2016/0110584 | A1 | 4/2016 | Remiszewski |
| 2019/0057769 | A1 | 2/2019 | Bernard |
| 2019/0065817 | A1 | 2/2019 | Mesmakhosroshahi et al. |
| 2019/0258878 | A1* | 8/2019 | Koivisto .............. G06V 10/774 |
| 2019/0347467 | A1 | 11/2019 | Ohsaka |
| 2021/0019342 | A1* | 1/2021 | Peng .................. G06F 16/5854 |
| 2021/0117729 | A1 | 4/2021 | Bharti |
| 2022/0215253 | A1* | 7/2022 | Zeineh ..................... G06N 3/08 |
| 2024/0232627 | A1* | 7/2024 | Zeineh .................. G06T 7/0012 |

OTHER PUBLICATIONS

"International Preliminary Report of Patentability in PCT/US2020/034320", Dec. 2, 2021.

"International Search Report and Written Opinion in PCT/US2020/034320", Jul. 31, 2020, 8 Pages.

Klauschen F., et al., "Scoring of 1-15 tumor-infiltrating lymphocytes: From visual estimation to machine learning", Seminars in Cancer Biology., vol. 52, Oct. 1, 2018, pp. 151-157.

Wahab Noorul, et al., "Two-phase deep 1-15 G06V convolutional neural network for reducing class skewness in histopathological images based breast cancer detection", Computers in Biology and Medicine, New York, NY, US, vol. 85, Apr. 18, 2017 (Apr. 18, 2017), pp. 86-97.

Wang Justin L, et al., "Classification of 1-15 White Blood Cells with PatternNet-fused Ensemble of Convolutional Neural Networks (PECNN)", 2018 IEEE International Symposium on Signal Processing and Information Technology (ISSPIT), IEEE, Dec. 6, 2018 (Dec. 6, 2018), pp. 325-330.

* cited by examiner

Identification of nuclei boundary based on object shapes

Identification of nuclei boundary based on image texture

SYSTEMS AND METHODS TO TRAIN A CELL OBJECT DETECTOR

CROSS REFERENCE TO PRIOR APPLICATIONS

This application is a continuation of U.S. application Ser. No. 17/613,433, filed Nov. 22, 2021, which is a § 371 national stage of PCT International Application No. PCT/US20/34320, filed May 22, 2020, claiming the benefit of U.S. Provisional Application No. 62/852,184, filed May 23, 2019, the contents of which is incorporated herein by reference in its entirety.

BACKGROUND

Computer vision technology has long been an interest in the field of biomedical imaging. Analysis of tissue samples, in particular, can often be tedious, weakly quantitative, and difficult to reproduce due to the vast quantities of data that need to be analyzed. Recently, machine learning based computer vision systems in other fields have achieved performance levels that suggest that significant improvements can be realized in biomedical imaging. However, these machine learning based computer vision systems often require input data that contains labels designating the items of interest.

The volume of labeled samples needed to train a machine learning system can be quite large compared to what a human may need in order to be trained. Generating large quantities of labeled data can be daunting for an unassisted human. For example, when the event of interest is rare, hard to consistently identify, or difficult to detect, such as presence of a mitotic figure, challenges can include distinguishing the mitotic figure from a very large number of candidate objects that may need to be labeled. Identifying candidate objects may require reviewing an even larger number of raw images.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to biomedical image processing, and in particular, to systems and methods to train a cell object detector to detect rare, hard to consistently identify, or difficult to detect objects within tissue images.

Some implementations can include a method, computer readable medium, and/or system to train a cell object detector. Some implementations can provide more accurate and robust model training compared to some conventional techniques. In some implementations, the disclosed systems and methods can be used to train a cell object detector that can include a machine learning model constructed to detect structures of interest (e.g., cell objects such as mitotic figures that can be rare, or hard or difficult to consistently identify) in tissue slide images.

Some implementations can include a computer-implemented method to train a machine-learning model to detect a particular type of cell object in a candidate electronic image, the machine-learning model including a first neural network. The method can include obtaining training data that includes a first set of cell images and corresponding first labels, wherein the first labels identify one or more types of objects in the first set of cell images including the particular type of cell object and a second set of cell images and corresponding second labels, wherein the second labels identify one or more look-alike objects that are similar in visual appearance to the particular type of cell object. The method can also include training the first neural network to detect one or more cell images that include candidate objects, wherein the candidate objects include objects of the particular type or look-alike objects.

The training can include providing the first set of cell images and the second set of cell images as input to the first neural network, obtaining, as output of the first neural network, one or more output labels for each image in the first set and the second set. The training can also include comparing the output labels for each image with the corresponding labels in the first set or the second set and adjusting one or more parameters of the first neural network based on the comparing.

The method can further include training the second neural network to identify an object of the particular type of cell object by providing the one or more cell images that include candidate objects detected by the first neural network as input to the second neural network and the labels associated with the one or more cell images, wherein after the training the second neural network can distinguish between objects of the particular type and look-alike objects.

In some implementations, the second set of cell images and corresponding second labels further identify one or more borderline objects similar in visual appearance to the particular type of cell object. In some implementations, the second set of cell images and corresponding second labels further identify one or more of normal objects or background objects.

In some implementations, the particular type of object includes a mitotic figure. In some implementations, the particular type of object includes an epithelial region.

In some implementations, training further includes receiving an initial outline of a potential object within an image in the first set of cell images, moving a center of a sample window to each pixel within the initial outline, and at each pixel location within the initial outline: obtaining a sample of image data corresponding to the sample window, performing one or more transformations on the sample of image data to generate one or more training images, and providing the training images to the second neural network as training data.

Some implementations can include a method to determine whether a particular type of cell object is present in a given cell image. The method can include providing the cell image as input to a trained machine-learning model, wherein the trained machine-learning model includes a first neural network and a second neural network. In some implementations, the machine learning model can be trained by a method include obtaining training data that includes a first set of cell images and corresponding first labels, wherein the first labels identify one or more types of objects in the first set of cell images including the particular type of cell object and a second set of cell images and corresponding second labels, wherein the second labels identify a look-alike object that is similar in visual appearance to the particular type of cell object. The method can also include training the first neural network to detect one or more cell images that include candidate objects, wherein the candidate objects include objects of the particular type of cell object or a look-alike object type.

In some implementations, the training can include providing the first set of cell images and the second set of cell images as input to the first neural network, obtaining, as output of the first neural network, one or more output labels for each image in the first set and the second set, comparing the output labels for each image with the corresponding labels in the first set or the second set, and adjusting one or more parameters of the first neural network based on the comparing. The method can also include training the second neural network to identify an object of the particular type of cell object by providing the one or more cell images that include candidate objects detected by the first neural network as input to the second neural network and the labels associated with the one or more cell images, wherein after the training the second neural network can distinguish between objects of the particular type and look-alike objects. The method can also include obtaining, as output of the second neural network, an indication of whether the particular type of cell object is present in the given cell image.

In some implementations, training the second neural network further includes receiving an initial outline of a potential object within an image in the first set of cell images, moving a center of a sample window to each pixel within the initial outline, and at each pixel location within the initial outline: obtaining a sample of image data corresponding to the sample window, performing one or more transformations on the sample of image data to generate one or more training images, and providing the training images to the second neural network as training data.

In some implementations, the second set of cell images and corresponding second labels further identify one or more borderline objects similar in visual appearance to the particular type of cell object. In some implementations, the second set of cell images and corresponding second labels further identify one or more of normal objects or background objects.

In some implementations, the particular type of object includes a mitotic figure. In some implementations, the particular type of object includes an epithelial region.

Some implementations can include a system, comprising one or more processors coupled to a computer readable memory having stored thereon software instructions that, when executed by the one or more processors, cause the one or more processors to perform or control performance of operations. The operations can include providing a cell image as input to a trained machine-learning model, wherein the trained machine-learning model includes a first neural network and a second neural network. In some implementations, the model is trained by obtaining training data that includes a first set of cell images and corresponding first labels, wherein the first labels identify one or more types of objects in the first set of cell images including a particular type of cell object and a second set of cell images and corresponding second labels, wherein the second labels identify a look-alike object that is similar in visual appearance to the particular type of cell object, and training the first neural network to detect one or more cell images that include candidate objects, wherein the candidate objects include objects of the particular type of cell object or a look-alike object type.

In some implementations, the training includes providing the first set of cell images and the second set of cell images as input to the first neural network, obtaining, as output of the first neural network, one or more output labels for each image in the first set and the second set, comparing the output labels for each image with the corresponding labels in the first set or the second set, and adjusting one or more parameters of the first neural network based on the comparing.

The operations can also include training the second neural network to identify an object of the particular type of cell object by providing the one or more cell images that include candidate objects detected by the first neural network as input to the second neural network and the labels associated with the one or more cell images, wherein after the training the second neural network can distinguish between objects of the particular type and look-alike objects. The operations can further include obtaining, as output of the second neural network, an indication of whether the particular type of cell object is present in a given cell image.

In some implementations, training the second neural network further includes receiving an initial outline of a potential object within an image in the first set of cell images, moving a center of a sample window to each pixel within the initial outline, and at each pixel location within the initial outline: obtaining a sample of image data corresponding to the sample window, performing one or more transformations on the sample of image data to generate one or more training images, and providing the training images to the second neural network as training data.

In some implementations, the second set of cell images and corresponding second labels further identify one or more borderline objects similar in visual appearance to the particular type of cell object. In some implementations, the second set of cell images and corresponding second labels further identify one or more of normal objects or background objects.

In some implementations, the particular type of object includes a mitotic figure. In some implementations, the particular type of object includes an epithelial region. In some implementations, the second set of cell images and corresponding second labels further identify one or more normal objects or background objects.

Some implementations can include a system having one or more hardware processors configured to perform or control performance of the method mentioned above. In some implementations, the one or more hardware processors may include a graphics processing unit (GPU) with a large number of processing units. In some implementations, the hardware processor may include a neural network processor. The system can include an imaging system.

Some implementations can include a non-transitory computer readable medium having software instruction stored thereon that, when executed by a processor, cause the processor to perform or control performance of operations according to the method mentioned above.

DETAILED DESCRIPTION

Figure 1:
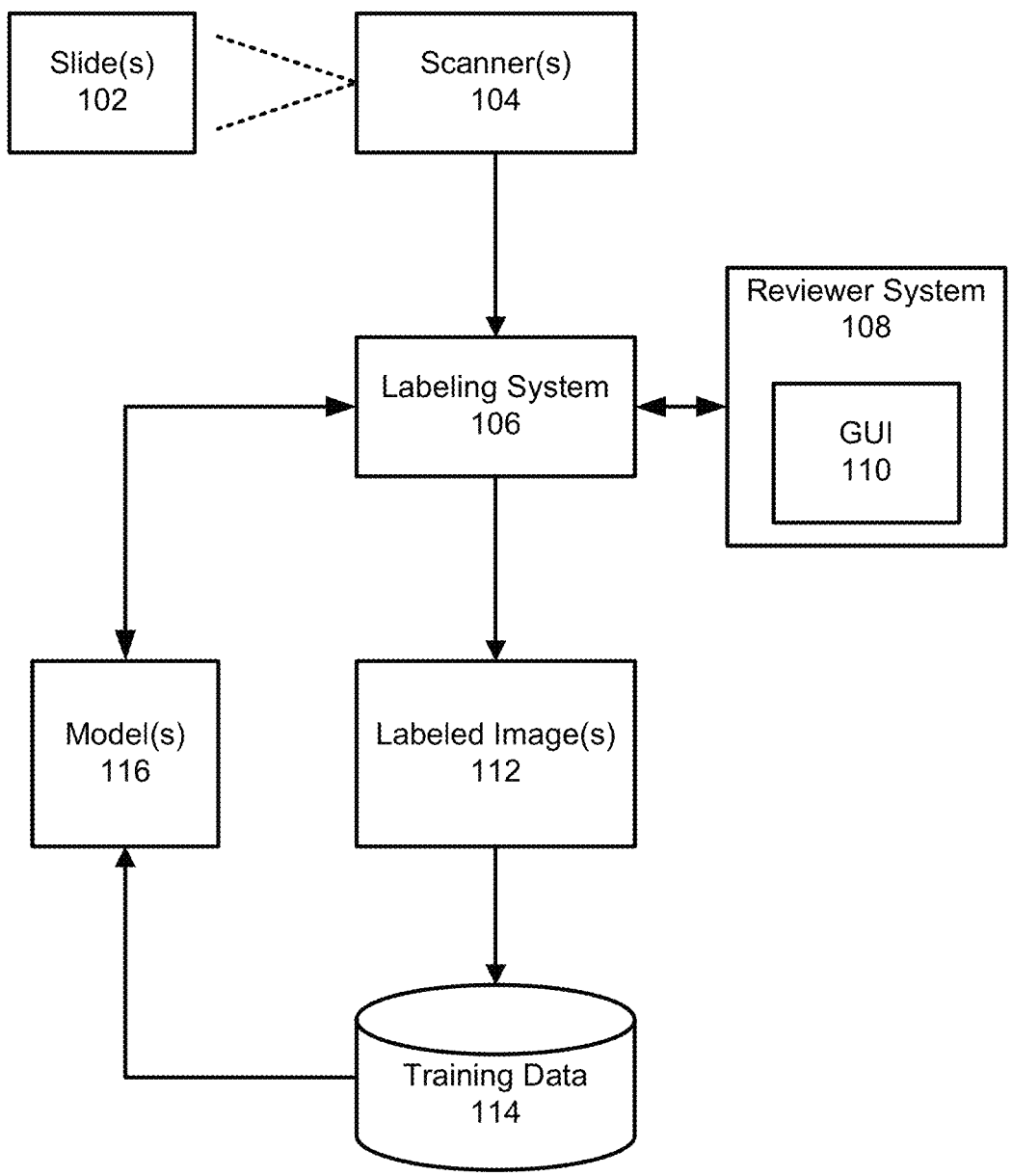
FIG. 1 is a diagram of an example tissue slide image labeling environment in accordance with some implementations.

A need may exist for a system and method that makes the process of training a cell object detector less labor intensive and more accurate. A technical problem may exist with conventional techniques for training a machine learning model to detect certain cell objects (e.g., rare objects, or objects that may be hard or difficult to consistently identify, or "rare/hard/difficult" objects as used herein) in that in order to achieve a suitable model performance level (e.g., a given false positive rate, a given false negative rate, a given accuracy level, etc.) a large number of images may be needed to train the machine learning model using conventional techniques. Obtaining a number of images containing rare cell objects (or objects that are hard to consistently identify or difficult to detect) may present a challenge. Also, conventional training techniques using a binary training approach for identifying a specific object among other objects grouped together in a "not the object of interest" category may not be effective for training a model to detect objects that, by their nature, may be difficult to consistently identify or detect even for a trained human expert. Some implementations were conceived in light of the above-mentioned problems, needs, and limitations, among other things.

Some implementations can include a method to train a cell object detector to detect rare cell objects (or objects that are hard to consistently identify or difficult to detect). Some implementations can include a method to generate a labeled data set and to train a neural network (or other machine learning model) to improve detection of objects that may be rare and/or difficult to distinguish from other object types in an image. Some implementations can include a method and system to train a cell object detector such that the training data captures morphological variability of the objects of interest. Morphological variability can be represented by one or more user-defined schema classifications. The user-defined schema classifications can include hard positives, which are objects that should be detected by a machine learning model but may difficult for the machine learning model to detect. The schema classifications can also include hard negative objects, which are objects that should not be detected but the machine learning model tends to confuse the hard negative objects as an instance of the desired object class. This is typically because there are other object types that are similar to the desired object and it is difficult to distinguish between them.

In some implementations, a first component is inclusion of labels from an enlarged training data set. In addition to labeled rare objects in a training set, some implementations add labeled objects in one or more user-defined schema classifications that can include objects that appear similar to the objects of interest, but have specific features that distinguish them (e.g., look-alike objects). In some implementations, user-defined schema classifications can include look-alike objects can include objects for which either: (1) there is no expert consensus on object identity, or (2) there is expert consensus on its identity, but computer models may typically misidentify the object. Differentiating objects in this larger set may require advanced clinical training.

Some implementations can include training using labeled objects that have a high degree of uncertainty and/or tend to result in differing opinions among experts (e.g., borderline objects). The training data can also include labeled normal cells, such as cells that are negative for the object of interest and are not look-alikes or borderlines. The technique disclosed herein differs from standard annotation procedures in machine learning which tend to include training data that is labeled in a binary fashion being limited, for example, to two classes: a specific object and everything else.

In some implementations, labeling of objects in training images can be done automatically, by humans, or both. The labeling process can be performed in multiple stages. First, objects can be annotated automatically or by non-clinical human raters to improve efficiency. This labeling may include actual objects, look-alike objects, borderline objects, etc. The labeled look-alike or borderline objects can then be distinguished into groups including objects of interest or look-alike/borderline objects automatically or by clinical experts. The labeled training images can optionally be combined with false positives from a previously trained neural network. This annotation workflow can help reduce the amount of time required of clinical experts by reducing the number of images the clinical experts need to review and allowing to them to focus on pre-reviewed objects (e.g., those images having a potential actual object such as those with look-alike objects or borderline objects).

The augmented data set can then be used to train a first object detector neural network (e.g., a coarse detector) for the purpose of identifying candidate objects using the augmented set of data. In some conventional machine learning model training techniques, only the specific objects of interest are used as positive examples to build a detector network. In some implementations, the disclosed technique, by including look-alike objects and borderline objects in the training data, a network or model can be trained that has a high degree of recall for the rare/hard/difficult objects of interest (e.g., the detector misses few objects). Precision (e.g., positive predictive value) may be low, but in some implementations, it may be more important that a coarse network does not miss many objects of interest. Also, efficiency may be improved by permitting the first detector to process images rapidly with a high degree of recall and less precision at a first stage. Dividing the detector into two stages and having a first stage with a lower precision requirement permits initial review and labeling of images to be performed by a non-clinical rater and thus reduces a need for clinical expert time.

A second detector model (e.g., a mimic/fine discriminator network) can then be trained to separate true positives (i.e., the rare/hard/difficult objects of interest) from false positives (e.g., look-alike objects, borderline objects, etc.). This permits the higher precision (and potentially more computationally intensive) task of fine discrimination to be performed on a fewer number of images. Labeling the images to be used for training the second detector stage may require input from a human clinical expert. However, the clinical expert's time can be used efficiently to focus on the difficult images (e.g., look-alikes and borderlines) where the clinical expert's expertise and experience may be needed most. In some implementations, training data sets can contain annotations by human experts, with classification of desired object type versus other similar objects that may not be clinically relevant. The fine discriminator output can be considered as object candidates or proposals, which have been generated automatically using the discriminator. These candidate objects can then be verified (or confirmed) as are true or false positives by comparing them to a corresponding human export annotation.

In some conventional training systems or techniques, look-alike objects may not be explicitly annotated and inserted into a training set of a detector network. In some conventional training systems, look-alike objects may be generated after a coarse network is trained in order to create examples of false positive objects to retrain the detector network, not used in the initial training.

A second distinctive aspect of the disclosed technique, in some implementations, involves how the extraction of training patches (or sections of image pixels) is done for the objects of interest. Some conventional techniques may include simple heuristics. That is, if a conventional system is looking for mitotic figures (or objects) and the mitotic figures are generally around 40 pixels by 40 pixels in image size, then the conventional system may extract a 64×64 pixel patch around the designated center point of the object of interest. Various transformations such as flips, rotations and translations may then be performed to provide the neural network views of the object from slightly different perspectives. Such an approach may yield sub-optimal sampling as rare/hard/difficult objects such as mitotic figures may have distinct patterns that may not be symmetric or may not have regular boundaries.

In some implementations, an outline of an object of interest can define the sampling strategy. For example, the outlines can be generated automatically or by a human. In some implementations, the system can use a multistage workflow for manual outlining to improve efficiency, as mentioned above. Initial outlining can be performed automatically or by non-clinical human raters. The initial outlines can then be reviewed automatically or by a clinical expert. One or more techniques similar to those described in U.S. Patent Application No. 62/828,243, entitled "Systems and Methods to Label Structures of Interest in Tissue Slide Images," by Jack Zenieh et al., and filed on Apr. 24, 2019, which is incorporated herein by reference in its entirety, the disclosure of which can be applied to generate outlines, with the optional addition of manual verification and correction.

Sampling for building a training data set for training a neural network (e.g., the fine discriminator network) can then be performed by moving a center point of a sampled image region to each pixel inside of the outline area. In some implementations, the size of the sampling window can be fixed (e.g., 64×64 pixels). Transformations such as flips, rotations, and translations can be subsequently performed on the sampled data. This technique solves one or more limitations of conventional techniques, for example, the disclosed technique provides an advantage of presenting a different configuration of the same object as an additional training sample. Furthermore, the disclosed technique can generate more samples than conventional techniques that may simply perform various transformations, and thus provide a richer set of training exemplars for training the fine discriminator network.

FIG. 1 is a diagram of an example tissue slide image labeling environment 100 in accordance with some implementations. The environment 100 includes one or more slides 102 (e.g., slides prepared with H&E, an IHC marker, or the like) and one or more scanners 104 arranged to scan the slides 102. The scanners 104 are coupled to a labeling system 106, which is also coupled to one or more reviewer systems 108 that can include a graphical user interface (GUI) 110. The labeling system 106 can operate as described in U.S. Patent Application No. 62/828,243, entitled "Systems and Methods to Label Structures of Interest in Tissue Slide Images," by Jack Zenieh et al., and filed on Apr. 24, 2019, which is incorporated herein by reference in its entirety.

The environment 100 also includes one or more labeled images 112 output by the labeling system 106 and provided to a training data store 114 that contains training data for a machine learning model 116 that is trained (or is being trained) to perform labeling of structures within tissue slide images and/or to detect rare cell objects (e.g., mitotic figures) within slide images. In operation, the labeling system 106 perform tissue slide image labeling of structures of interest (e.g., epithelia and/or stroma, mitotic figures, etc.). In some implementations, the labels include image coordinates of portions contained in a nucleus, with an object classification type for that nucleus. The labels can also include an outline of the nucleus boundary and a bounding box enclosing the object of interest. These can be stored as part of the labeled images (e.g., 112) that can be stored in a database system containing images, coordinates, object class, and the like.

The machine learning model 116 can include one or more models, for example a coarse detector and a fine detector. The machine learning model 116 can include one or more neural networks such as a convolutional neural network or fully convolutional neural network. A neural network can include a hierarchical composite of multiple primary processing units called neurons. Contrary to the conventional multiple-layer perceptions (MLPs), where each neuron is directly collected to all neurons in a previous layer, a convolutional neural network (CNN) assumes the input as images and exploits spatially local correlation by enforcing a local connectivity pattern between neurons of adjacent layers.

A trained CNN (or other model) can be applied in multiple ways. One example would be training a CNN (e.g., 116) to select regions of interest based upon an available training set (e.g., 114) of selected and not selected regions of interest based on human input. Another example can include, in a basic trained form, using the trained CNN on a given ROI to detect the likely mitotic figure candidates. Also, it is possible to use the trained CNN as a hotspot detector over the whole slide where the most likely candidates are located over the entire slide. Additional training or network modification may be needed for the trained CNN to operate on an entire slide, as the trained data set typically excludes extraneous and non-tumor tissue on the slide.

Figure 2:
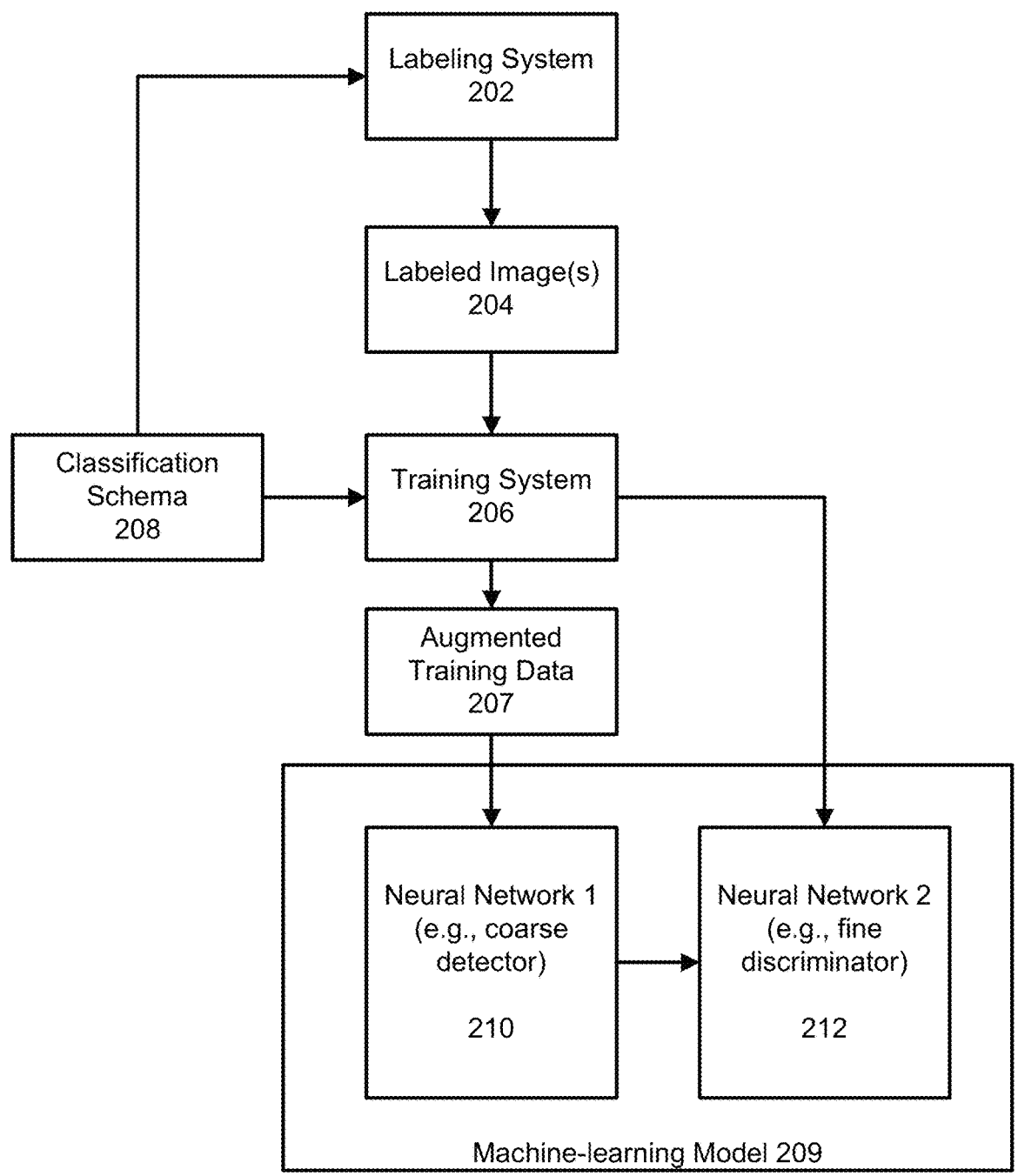
FIG. 2 is a diagram of an example cell object detector training system in accordance with some implementations.

FIG. 2 is a diagram of an example cell object detector training system in accordance with some implementations. As shown in FIG. 2, a labeling system 202 provides initial labeled images 204 to a training system 206. A classification schema 208 is also provided as a schema for labeling the objects within images and for the training system to use in generating an augmented training data set.

The training system 206 uses the labeled images 204 (e.g., initial training data) and the classification schema 208 to generate augmented training data 207 that is provided to train a machine learning model 209 having a first neural network 210 and a second neural network 212. The training system 206 can be separate from the models (210-212) or integrated with one or more of the models (210-212). In some implementations, the training system 206 and/or one or more of the models (212-217) can be part of an imaging system such as a medical imaging system. Labeling can be done as a per image label (center of the image contains a specific cell type) or a more detailed per pixel label (locations and boundaries of different cell types or structures in the image).

Example operational details of the training system 206 are described below in connection with FIGS. 3 and 4.

Figure 3:
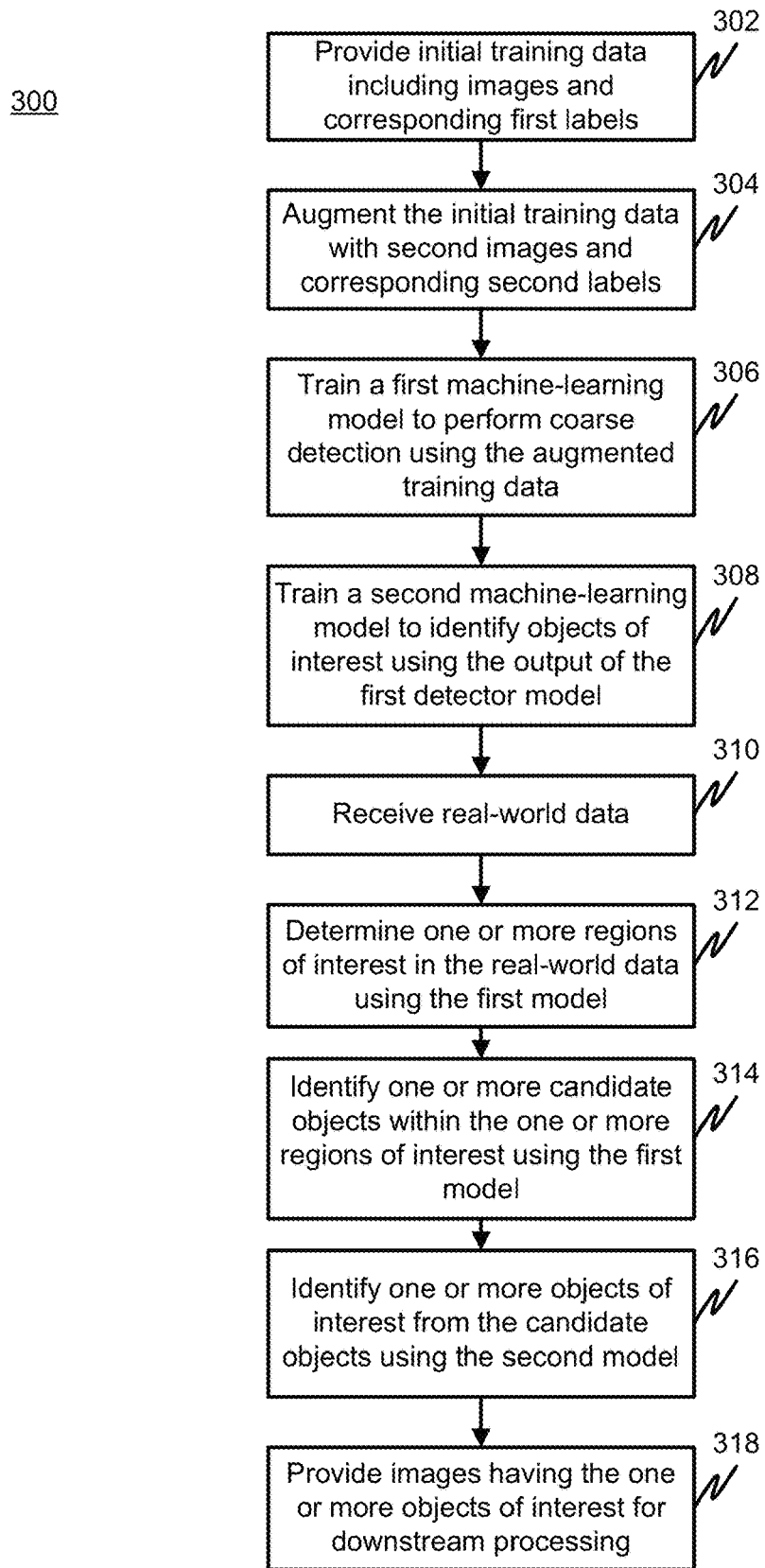
FIG. 3 is a flowchart of an example method for cell object detector training in accordance with some implementations.

FIG. 3 is a flowchart of an example method for cell object detector training in accordance with some implementations. Processing begins at 302, where initial training data is provided. For example, the initial training data can include a data set that includes images with one or more labeled objects of interest (e.g., rare/hard/difficult objects) and images that do not include one or more labeled objects of interest. Processing continues to 304.

At 304, the initial training data is augmented. For example, the initial training data can be augmented with one or more images containing one or more labeled objects classified according to an object classification schema (e.g., 208) that can include one or more user-defined classifications such as look-alike objects, borderline objects, mitotic objects, abnormal mitotic, and/or abnormal borderline. Some implementations can provide functionality for creating user-defined classifications or sub-classifications based on morphological criteria. For example, the user-defined schema classifications can include one or more classifications or sub-classifications based on morphological criteria that do not correspond to standard pathological classification or nomenclature.

The user-defined schema classifications can include morphological features and/or color that depart from standard pathological classification in one or more ways. For example, a user-defined schema classification or sub-classification can include an absence of one or more morphological attributes or features typically associated with a standard pathological classification. The user-defined schema classifications or sub-classifications can be dynamic in that new or different classifications or sub-classifications can be added to a classification schema and be used to update a machine learning model. An advantage of the disclosed user-defined schema classifications for training a cell object detector is that the trained detector may achieve a high degree of recall at a first stage with a high degree of discrimination at a second stage. An example classification schema is shown in Table 1.

aries may cause experts to weight classification more towards mitotic figures rather than borderline mitotic objects. Smooth boundaries can lead to look-alike classification, where objects in between can cause debate/disagreement and should be placed into the borderline class. Objects that appear faint and not as dark blue also tend to be considered less likely to be mitotic. A lot of decision also depends on the neighboring context (e.g., appearance of cells near the object, tissue structure, etc.).

In addition to classifying objects according to a schema such as that contained in Table 1, the objects can be grouped according to one or more schema classifications. For example, the classifications and sub-classifications can include:

Group 1—Abnormal mitotic+Mitotic+Borderline 1+Telophase;
Group 2—Borderline 3+Abnormal borderline;
Group 3—Look-alike 1+Look-alike 2+Regular nuclei; and
Group 4—Artifact+background.

Telophase can include a stage where mitotic objects are still splitting so they appear as pairs that line up in parallel. Telophase objects can be considered as a special case for mitotic figures. In some implementations, the user-defined classifications and sub-classifications can be used as targets for training. A classifier (or machine learning model) can be trained to distinguish objects in different groupings of user-defined classifications and sub-classifications but may not distinguish between different object types within the same classification grouping. The training data can include a first set of cell images and corresponding first labels, where the first labels identify one or more types of objects in the first set of cell images including the particular type of cell object and a second set of cell images and corresponding second labels, and where the second labels identify one or more look-alike objects that are similar in visual appearance to the particular type of cell object. Processing continues to 306.

At 306, a first detector model (e.g., a coarse detector neural network such as 210 or 504) is trained using the augmented training data. For example, training the first neural network to detect one or more cell images that include candidate objects (e.g., objects of a particular type or look-alike objects) can include providing the first set of cell

TABLE 1

| Example Object Classification Schema | |
| --- | --- |
| Abnormal mitotic | Mitotic figures with strange shape (e.g., tripolar) or enlarged cells that are not apoptotic |
| Abnormal borderline | Enlarged cells that can be mitotic but may also be apoptotic. Difficult to distinguish between the two. |
| Mitotic | Definite mitotic figures with low chance of disagreement between experts; has well defined chromatin boundaries, shapes, and cytoplasm patterns. Also stained in IHC with PHH3 |
| Borderline 1 | Mitotic figures like above, but not stained positive with PHH3 |
| Borderline 2 | Fragments of mitotic figures stained positive in PHH3. No longer appear as definite mitotic figures due to sectioning. |
| Borderline 3 | Possible mitotic figures, with high levels of disagreement between experts. |
| Look-alike 1 | Cells that appear dark blue and can be confused as mitotic by the algorithm. PHH3 IHC staining is negative |
| Look-alike 2 | Cells that appear dark blue and can be confused as mitotic by the algorithm. PHH3 IHC staining is positive |

In some implementations, the characteristics associated with a user-defined schema classification can depend on experience of human experts. The user-defined schema classifications can mostly relate to the boundary of objects (e.g., objects that appear solid dark blue). Rugged boundimages and the second set of cell images as input to the first neural network, obtaining, as output of the first neural network, one or more output labels for each image in the first set and the second set, comparing the output labels for each image with the corresponding labels in the first set or the second set, and adjusting one or more parameters of the first neural network based on the comparing.

In some implementations, training can be performed using original image data that is perturbed using synthetic random transformation of colors (e.g., stain mapping and/or contrast change) or geometry (e.g., shifts and/or rotations) with labels for that image held fixed. These random transformations enable the creation of a neural network that is more robust to variations in real world data. Processing continues to 308.

At 308, optionally, a second detector model (e.g., a fine detector such as 212 or 508) is trained using output from the first detector model and/or the augmented training data. For example, the second detector model can be trained using images identified by the first detector model as having a candidate object of interest. The candidate objects of interest can include one or more of an actual object of interest, a look-alike object, or a borderline object. The candidate objects can be labeled automatically or by a human expert. For example, the labeling can include actual object of interest, look-alike, borderline, or other labels. The images with the labeled candidate objects can then be used to train the second detector model.

For example, training can include training the second model (e.g., neural network) to identify an object of the particular type of cell object by providing the one or more cell images that include candidate objects detected by the first neural network as input to the second neural network and the labels associated with the one or more cell images, wherein after the training the second neural network can distinguish between objects of the particular type and look-alike objects. Processing continues to 310.

At 310, optionally, real-world data is received. Real-world data can include one or more images of tissue and/or cells to be evaluated by one or more of the models to detect or identify objects (e.g., mitotic figures) within the tissue or cells. In some implementations, images can be received in the form of whole slide pyramidal/multi-resolution images arranged as tiles within a TIFF container using JPEG compression. Images can also be regions within the whole slide stored as a 2D image with color (e.g., single tile, no pyramids) stored using lossless compression (e.g., PNG) or lossy compression (e.g., JPEG). Processing continues to 312.

At 312, optionally, one or more regions of interest within the real-world data are identified using the first detector model. A region of interest can include an area of the image that contains a potential candidate object of interest. Processing continues to 314.

At 314, one or more candidate objects are identified within the one or more regions of interest. For example, the first detector model can be used to make a coarse identification of one or more objects of interest within the one or more regions of interest. The first detector network or model can be trained to have a high degree of recall for the rare/hard/difficult objects of interest, such that the detector misses few objects. Precision (e.g., positive predictive value) may be low, but in some implementations, it may be more important that a coarse network (i.e., first detector model or network) does not miss many objects of interest. For example, in some implementations, practical utility is generally reached with precision and recall each being above 0.7. Further, in some implementations, qualitatively good performance is reached at performance measures being above 0.8. Processing continues to 316.

At 316, a group of one or more selected objects are selected from among the one or more candidate objects using the second detector model. For example, the second detector model can be trained to separate true positives (e.g., rare/hard/difficult objects of interest) from false positives (e.g., look-alike objects, borderline objects, etc.). Processing continues to 318.

Figure 7:
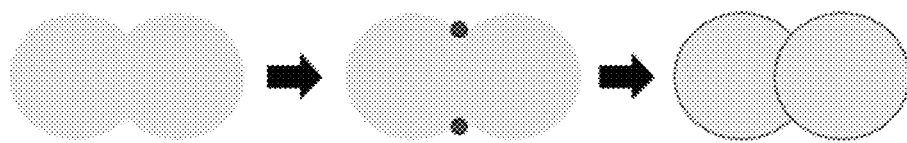
FIG. 7 is a diagram of identification of nuclei boundary based on object shape in accordance with some implementations.
Figure 8:
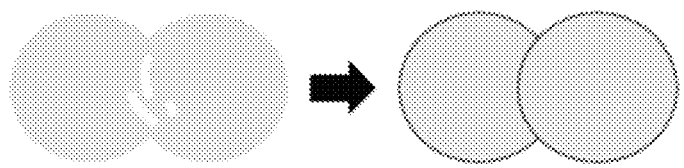
FIG. 8 is a diagram of identification of nuclei boundary based on image texture in accordance with some implementations.

The detectors at 312 and 316 can be implemented as Fully Convolutional Networks (FCN) when per pixel labels are available. FCN performs segmentation, assigning cell label types to each pixel enabling fine localization. Distinct cell objects are retrieved from segmentation outputs using a region extraction algorithm such as connected component analysis, which creates unique labels to groups of pixels that are connected to others with the same label. Some implementations of FCN can also be used to separate constructs more granular than cell types such as nuclei boundaries which define the separation of cells that are close to each other. Nuclei boundary segmentation is a process where an algorithm delineates cell nucleus based on shape (e.g., as shown in FIG. 7) and image texture (e.g., as shown in FIG. 8), in a variety of nuclei configurations (well separated or in a clump). Nuclei shape is generally elliptical thus a clump of nuclei can be separated by finding v-shapes between two blobs. White gaps in chromatin patterns of nuclei also provides information for separating two nuclei. Both are utilized in boundary segmentation to automatically separate cells that are touching or overlapping, providing meaningful morphological measures related to cell density.

At 318, the group of one or more selected objects can be provided as output for subsequent downstream processing by a same or different system. In some implementations, a trained neural network can be applied to whole slide images or regions of interest within the slide, where detections are counted within a specific area limit (e.g., 1 mm square area). Finding an area with maximum count of mitotic figures in the whole slide is a measure of cancer proliferation, which has been shown to be predictive for patient outcome. The count of mitotic figures in the whole slide can also be measured relative to the count of regular nuclei to provide a density measure that can be used to measure the phenotype of cancer proliferation.

Figure 4:
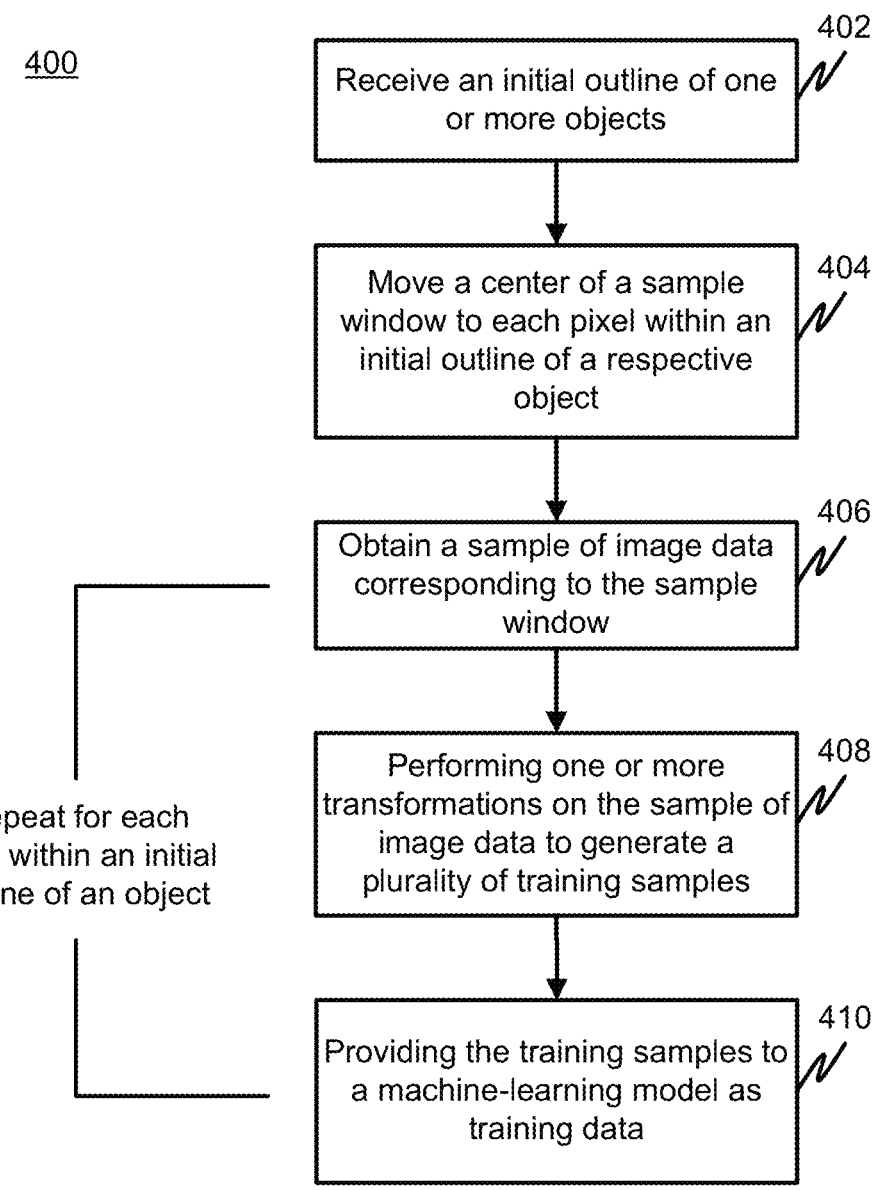
FIG. 4 is a flowchart of an example method for cell object detector training in accordance with some implementations.

FIG. 4 is a flowchart of an example method for cell object detector training in accordance with some implementations. Processing begins at 402, where an initial outline of one or more objects is received. In some implementations, initial outlining can be performed automatically or by non-clinical human raters. The initial outlines can then be reviewed automatically or by a clinical expert. Processing continues to 404.

At 404, a center of a sampling window is located on each pixel within the initial outline. The sampling window is a window of a given size (e.g., 64 by 64 pixels) that is used to sample an underlying image. For example, in an image containing an object of interest that has been outlined, the sampling window can be centered at each pixel within the outlined object of interest and the pixels within the sample window scope can be sampled and stored for subsequent use. Processing continues to 406.

For each pixel location within the initial outline of an object of interest where the sampling window is centered, 406-410 are performed.

At 406, a sample of image data is obtained correspond to the sample window location. Processing continues to 408.

At 408, one or more transformations can be performed on the sampled image data to generate one or more corresponding training samples. The transformations can include flips, rotations and/or translations. Processing continues to 410.

At 410, the training samples from 408 are provided as a portion of training data to a detector model (e.g., a first or coarse detector and/or a second or fine detector). For example, the training samples can be provided to the second neural network model and used to train the second neural network model to improve the fine discrimination accuracy. Processing continues to 406 for additional pixels within an outlined object or ends when no pixels in the outlined object remain to be processed.

Blocks 302-318 and 402-410 (as well as any other blocks or functions shown or described herein) can be repeated in whole or in part and performed in the same or different orders. Moreover, certain blocks can be eliminated, modified, combined with other blocks, and/or supplemented with other operations.

Some implementations can include a software application for specialized medical equipment (e.g., slide scanning systems, imaging systems, etc.), desktop computers, laptop computers, and mobile devices (e.g., smartphones, tablet computing devices, etc.) that can be used by physicians and/or other health care or biomedical professionals to train a model to detect cell objects in tissue images. The software application can also be provided as a web service accessible over a wired or wireless computer network.

In some implementations, the method, or portions of the method, can be initiated automatically by a device. For example, the method (or portions thereof) can be repeatedly performed or performed based on the occurrence of one or more particular events or conditions. For example, such events or conditions can include: obtaining one or more images that have been newly captured by, uploaded to, or otherwise accessible by a device (e.g., an imaging device such as a slide scanner or other tissue imaging system), a predetermined time period having expired since the last performance of method 300, 400 and/or 500, and/or one or more other events or conditions occurring which can be specified in settings of a device implementing method 300 and/or 400. In some implementations, such conditions can be previously specified by a user in stored custom preferences of the user (accessible by a device or method with user consent). In another example, an imaging device (e.g., slide scanner) or other medical system can capture one or more images and can perform the method 300, 400 and/or 500. In addition, or alternatively, an imaging device can send one or more captured images to an external system (e.g., a cloud computing system, a server, a mobile device, etc.) over a network, and the external system can process the images using method 300, 400 and/or 500.

Figure 5:
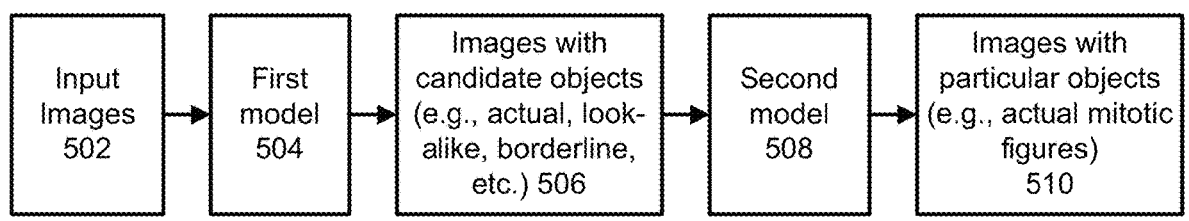
FIG. 5 is a diagram of cell object detection system using a machine-learning model in accordance with some implementations.

FIG. 5 is a diagram of cell object detection system 500 using a machine-learning model in accordance with some implementations. The system 500 receives input images 502. The input images 502 can be evaluated using a first model 504. The first model can include a coarse object detector. The coarse object detector may be trained to have a high degree of recall and a low precision such that few or no objects are missed at the first stage.

As an example, to help illustrate the disclosed subject matter, assume the machine learning model were being built and trained to identify images men with beards. The input images could include a set of one thousand images in which 5 images are of actual men with beards, 50 images are of people wearing fake beards, and 100 images are of men with stubble (e.g., a day's beard growth), a mustache or other non-beard facial hair.

The first model 504 outputs images having a candidate object (e.g., an actual particular object, a look-alike object, a borderline object, etc.). In the beard example, the first model can be trained to identify and output all images possibly showing a man with a beard as images containing candidate objects. In this case, of the 1000 images, the first model 504 may identify and output 155 images with candidate objects that possibly show a man with a beard (i.e., the 5 actual beard images, the 50 fake beard images, and the 100 stubble and other facial hair images). The first model 504 can have a high degree of recall resulting, at least in part, from an augmented training set that includes labeled look-alike and borderline images as initial training data.

The second model 508 is trained to discriminate candidate objects. For example, the second model 508 is trained to determine whether a candidate object is an actual particular object (e.g., mitotic figure or epi-stroma figure, etc.). The second model 508 can be trained to discriminate between actual objects and look-alike or borderline objects. Returning to the beard example, the second model 508 can be trained to discriminate a real beard from a fake beard or stubble (or other non-beard facial hair). Thus, in the beard example, the second model would only need to process 155 images. From the 155 images, the second model could discriminate the 5 actual beard images from the other candidate objects (fake beards, etc.).

The second model 508 outputs images 510 with labeled objects of interest or objects of a particular type (e.g., mitotic figure) for downstream processing. Also, the output images 510 can be processed according to the method of FIG. 4. In the beard example, the 5 actual beard images could be output. Also, the 5 actual beard images could be processed according to the method of FIG. 4 to generate more training samples from the five images to provide for training the second model 508 to help improve the accuracy of the second model 508.

Figure 6:
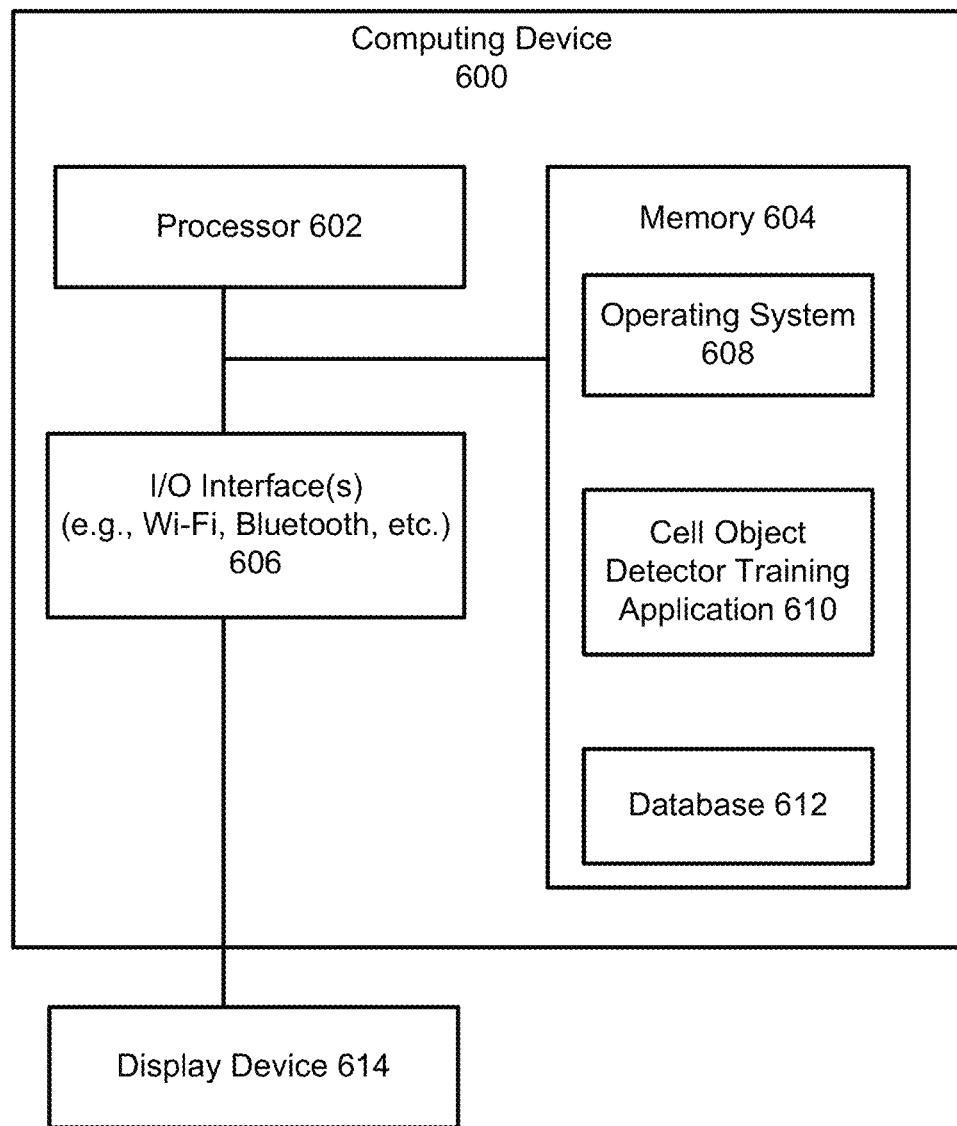
FIG. 6 is a diagram of an example system configured to train a cell object detector in accordance with some implementations.

FIG. 6 is a block diagram of an example computing device 600 which may be used to implement one or more features described herein. In one example, computing device 600 may be used to implement a computer device, e.g., tissue slide labeling system and/or training system device (e.g., 106 of FIG. 1 or 206 of FIG. 2) and perform appropriate method implementations described herein. Device 600 can be any suitable computer system, server, or other electronic or hardware device. For example, the device 600 can be a mainframe computer, desktop computer, workstation, portable computer (including a smart phone or laptop), or medical device. In some implementations, device 600 includes a processor 602, a memory 604, and input/output (I/O) interface 606, all operatively coupled to each other.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 602 and/or integrated therewith. Memory 604 can store software operating on the server device 600 by the processor 602, including an operating system 608, one or more applications 610, e.g., a tissue slide image labeling application and application data 620. In some implementations, applications 610 can include instructions that, in response to execution by processor 602, enable processor 602 to perform or control performance of the functions described herein, e.g., some or all of the methods of FIGS. 3-5.

For example, applications 610 can include a cell object detector training application, which as described herein can train a cell object detector (e.g., a two-stage machine learning model). Any of software in memory 604 can alternatively be stored on any other suitable storage location or computer-readable medium. In addition, memory 604 (and/or other connected storage device(s)) can store images, and other instructions and data used in the features described herein. Memory 604 and any other type of storage (magnetic disk, optical disk, magnetic tape, or other tangible media) can be considered "storage" or "storage devices."

In various implementations, application(s) 610 can include a machine-learning model (e.g., a two-stage neural network model including a coarse detector and a fine discriminator) that can be trained to detect cell objects in images. In some implementations, training data may include tissue slide scan data, CT image data, etc.

The model form or structure may specify connectivity between various nodes and organization of nodes into layers. For example, nodes of a first layer (e.g., input layer) may receive data as input data or application data. Such data can include, for example, one or more pixels. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be an identified and/or labeled candidate object or particular object of interest, etc. depending on the specific trained model.

In some implementations, the trained model may include a weight of individual nodes and/or connections. A respective weight may be applied to a connection between each pair of nodes that are connected per the model form, e.g., nodes in successive layers of the neural network. For example, the respective weights may be randomly assigned, or initialized to default values. The model may then be trained, e.g., using data, to produce a result, where the training can include adjusting one or more of nodes, node structure, connections, and/or weights.

A model can include a loss function representing the difference between a predicted value and an actual label. The model can be trained to minimize the loss function. Training can include supervised or unsupervised learning techniques. In supervised learning, the training data can include a plurality of inputs (e.g., tissue slide images) and a corresponding expected output for each input (e.g., tissue slide images with objects or structures of interest identified and labeled). Based on a comparison of the output of the model with the expected output (e.g., computing the loss function), values of the weights are automatically adjusted, e.g., in a manner that increases a probability that the model produces the expected output when provided similar input (i.e., reduces the loss function).

I/O interface 606 can provide functions to enable interfacing the computing device 600 with other systems and devices. For example, network communication devices, storage devices (e.g., memory and/or database), and input/output devices can communicate via the I/O interface 606. In some implementations, the I/O interface 606 can connect to interface devices including input devices (keyboard, pointing device, touchscreen, microphone, camera, scanner, etc.) and/or output devices (display device, speaker devices, printer, motor, etc.). Display device 514 is one example of an output device that can be used to display images and other data, e.g., one or more tissue slide images, structure of interest identification, and labels provided by an application as described herein. Display device 614 can be connected to device 600 via local connections (e.g., display bus) and/or via networked connections and can be any suitable display device, some examples of which are described below.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While training system 206 is described as performing operations as described in some implementations herein, any suitable component or combination of components of system 206 or a similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., the methods shown in FIGS. 3-5) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. field-programmable gate array (FPGA), complex programmable logic device), general purpose processors, graphics processing units (or GPUs) application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device, laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. For example, while detection of mitotic figures is described as an example to illustrate an implementation of the disclosed subject matter, the system and methods described herein can be extended to other types of image studies or other types of biomedical imaging for other purposes or for diagnosing other diseases. Some implementations can detect cell object or non-cell object types that are difficult to distinguish properly from other more common cell types or that are particularly clinically useful. For example, detection of neutrophils in colon tissue, tumor cells in lymph nodes, lymphocytes in tumor regions and Lewy neurites in brain or nerve tissue samples.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
    obtaining training data that includes a first set of cell images and corresponding first labels;
    augmenting the training data with a second set of cell images and corresponding second labels;
    training a first neural network to perform coarse detection using the augmented training data to detect one or more cell images that include candidate objects; and
    training a second neural network to perform fine discrimination to identify an object of a particular type of cell object by providing one or more cell images that include the candidate objects detected by the first neural network as input to the second neural network and labels associated with the one or more cell images, wherein after the training the second neural network can distinguish between objects of a particular type and look-alike objects.

2. The method of claim 1, wherein training the second neural network further includes:
    receiving an initial outline of a potential object within an image in the first set of cell images;
    moving a center of a sample window to each pixel within the initial outline; and
    at each pixel within the initial outline:
        obtaining a sample of image data corresponding to the sample window;
        performing one or more transformations on the sample of image data to generate one or more training images; and
        providing the training images to the second neural network as training data.

3. The method of claim 2, wherein the transformations are selected from a group of flips, rotations, translations, and combinations thereof.

4. The method of claim 1, wherein the corresponding first labels identify one or more types of objects in the first set of cell images including the particular type of cell object and wherein the corresponding second labels identify the one or more look-alike objects in the second set of cell images that are similar in visual appearance to the particular type of cell object.

5. The method of claim 1, wherein the second set of cell images includes false positives from a previously trained neural network.

6. The computer-implemented method of claim 1, further comprising:
    obtaining, as output of the second neural network, an indication of whether the particular type of cell object is present in a cell image.

7. The method of claim 1, wherein the first neural network is trained by perturbing original image data using synthetic random transformation of colors or geometry with the corresponding first labels or the corresponding second labels held fixed.

8. The computer implemented method of claim 1, wherein the look-alike objects comprise hard negatives.

9. The computer implemented method of claim 1, wherein the look-alike objects are stained a similar color shade in the one or more cell images to the color shade of objects of the particular type, but have at least one structural difference from the objects of the particular type.

10. The computer-implemented method of claim 9, wherein the at least one structural difference of the look-alike objects is a difference in a texture of a structure.

11. The computer-implemented method of claim 9, wherein the at least one structural difference of the look-alike objects is a difference in a color of a structure.

12. The computer-implemented method of claim 9, wherein the at least one structural difference of the look-alike objects is a difference in a boundary characteristic.

13. The computer-implemented method of claim 12, wherein the at least one structural difference of the look-alike objects is the look-alike objects have a smoother boundary than the objects of the particular type.

14. The computer-implemented method of claim 1, wherein the look-alike objects are not distinguishable by the first neural network from the objects of the particular type, but have at least one structural difference from the objects of the particular type.

15. The computer implemented method of claim 1, wherein the look-alike objects are stained a similar color shade in the cell images to the color shade of objects of the particular type, but have at least one feature difference from the objects of the particular type.

16. The computer implemented method of claim 1, wherein the objects of the particular type comprise mitotic or epi-stroma figures.

17. A non-transitory computer-readable medium with instructions stored thereon that, when executed by one or more computers, cause the one or more computers to perform operations comprising:
obtaining training data that includes a first set of cell images and corresponding first labels;
augmenting the training data with a second set of cell images and corresponding second labels;
training a first neural network to perform coarse detection using the augmented training data to detect one or more cell images that include candidate objects; and
training a second neural network to perform fine discrimination to identify an object of a particular type of cell object by providing one or more cell images that include the candidate objects detected by the first neural network as input to the second neural network and labels associated with the one or more cell images, wherein after the training the second neural network can distinguish between objects of a particular type and look-alike objects.

18. The non-transitory computer-readable medium of claim 17, wherein training the second neural network further includes:
receiving an initial outline of a potential object within an image in the first set of cell images;
moving a center of a sample window to each pixel within the initial outline;
at each pixel location within the initial outline:
obtaining a sample of image data corresponding to the sample window;
performing one or more transformations on the sample of image data to generate one or more training images; and
providing the training images to the second neural network as training data.

19. The non-transitory computer-readable medium of claim 18, wherein the transformations are selected from a group of flips, rotations, translations, and combinations thereof.

20. The non-transitory computer-readable medium of claim 17, wherein the corresponding first labels identify one or more types of objects in the first set of cell images including the particular type of cell object and wherein the corresponding second labels identify the one or more look-alike objects in the second set of cell images that are similar in visual appearance to the particular type of cell object.

21. The non-transitory computer-readable medium of claim 17, wherein the second set of cell images includes false positives from a previously trained neural network.

22. The non-transitory computer-readable medium of claim 17, wherein the operations further include:
obtaining, as output of the second neural network, an indication of whether the particular type of cell object is present in a cell image.

23. The non-transitory computer-readable medium of claim 17, wherein the first neural network is trained by perturbing original image data using synthetic random transformation of colors or geometry with the corresponding first labels or the corresponding second labels held fixed.

24. A system, comprising:
one or more processors coupled to a computer readable memory having stored thereon software instructions that, when executed by the one or more processors, cause the one or more processors to perform or control performance of operations including:
obtaining training data that includes a first set of cell images and corresponding first labels;
augmenting the training data with a second set of cell images and corresponding second labels;
training a first neural network to perform coarse detection using the augmented training data to detect one or more cell images that include candidate objects; and
training a second neural network to perform fine discrimination to identify an object of a particular type of cell object by providing one or more cell images that include the candidate objects detected by the first neural network as input to the second neural network and labels associated with the one or more cell images, wherein after the training the second neural network can distinguish between objects of a particular type and look-alike objects.

25. The system of claim 24, wherein training the second neural network further includes:
receiving an initial outline of a potential object within an image in the first set of cell images;
moving a center of a sample window to each pixel within the initial outline; and
at each pixel within the initial outline:
obtaining a sample of image data corresponding to the sample window;
performing one or more transformations on the sample of image data to generate one or more training images; and
providing the training images to the second neural network as training data.

26. The system of claim 25, wherein the transformations are selected from a group of flips, rotations, translations, and combinations thereof.

27. The system of claim 24, wherein the corresponding first labels identify one or more types of objects in the first set of cell images including the particular type of cell object and wherein the corresponding second labels identify the one or more look-alike objects in the second set of cell images that are similar in visual appearance to the particular type of cell object.

28. The system of claim 24, wherein the second set of cell images includes false positives from a previously trained neural network.

29. The system of claim 24, wherein the operations further include:
obtaining, as output of the second neural network, an indication of whether the particular type of cell object is present in a cell image.

* * * * *